Dec. 3, 1940.  W. I. TAYLOR ET AL  2,223,538
MANUFACTURE OF MOLDED ARTICLES
Filed Oct. 9, 1937
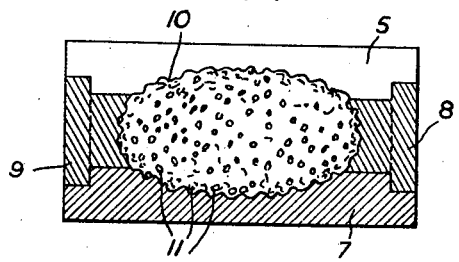
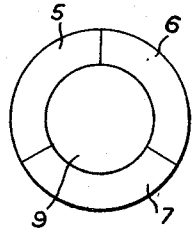
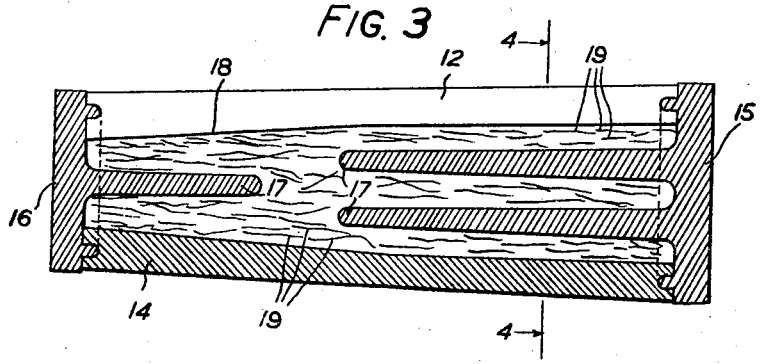
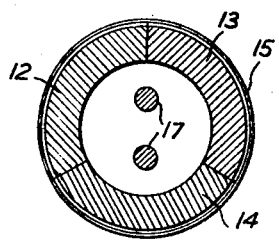
Inventors:
W. I. TAYLOR
L. B. GIBBINS
Attorneys

UNITED STATES PATENT OFFICE 2,223,538

MANUFACTURE OF MOLDED ARTICLES

William Ivan Taylor and Leslie Brisbane Gibbins, Spondon, near Derby, England, assignors to Celanese Corporation of America, a corporation of Delaware Application October 9, 1937, Serial No. 168,131. In Great Britain November 6, 1936

5 Claims. (Cl. 18—48)

This invention relates to improvements in the manufacture of molded articles and particularly to improvements in processes and apparatus for the manufacture of molded articles having a porous structure.

The production of artificial sponges by shaping in a mold a cellulose acetate or other suitable composition which contains bubbles of gas or particles of water-soluble substances or other suitable substances such that a product having a porous structure is finally obtained is described in U. S. Patent No. 2,085,052.

It has now been discovered that improved sponges may be obtained by shaping the composition in a mold, the surface of which bears protuberances of the required dimensions to give pores of the desired character in the surface of the product. Thus, the dimensions of the protuberances may be similar to those of the pores in natural sponges, for example a quarter to a half an inch or more in diameter, or they may be considerably smaller, for example of the order of 1 or 2 mms. Preferably, the surface of the mold is also sand-blasted or roughened in some other suitable manner. The present invention includes both molds having surfaces bearing protuberances and also processes for the production of porous articles by means of such molds.

The present invention is of particular value in the manufacture of regenerated cellulose sponges from cellulose acetate and other organic esters of cellulose as is described in U. S. Patent No. 2,085,052. The manufacture of spch articles may be carried out by means of molds having protuberances using compositions such as are described in this specification and effecting saponification as described therein. For example, sponge-like masses may be obtained by shaping a composition consisting of about five parts of cellulose acetate, fifteen parts of acetone or other solvent and eighty parts of salt crystals of a diameter of about a quarter of an inch and a small proportion, for example about one part of cotton linters. This composition is shaped in a mold, the surfaces of which have protuberances of suitable dimensions. The shaped composition is dried, e. g. at a temperature of about 100° C. and the dried mass is then extracted repeatedly with water in order to remove the soluble salt. The porous mass obtained is then saponified, e. g. by treating it for about 24 hours with 10% caustic soda.

Saponification may be continued until the mass is completely saponified, or it may be interrupted when only partial saponification has been effected, e. g. the structure has been saponified to about three quarters of its depth. It may be carried out by means of caustic soda or other inorganic base, e. g. sodium silicate, or with methylamine, ethylene diamine or other organic base.

In order to facilitate initial setting of the composition the surface of the mold may be dressed with an alkaline dressing, for example a strongly alkaline soft soap, a solution of sodium silicate or a thin paste containing caustic soda or other strong base. When the cellulose acetate composition comes into contact with the alkaline material on the surface of the mold the surface layers of the composition are saponified and are thus rendered insoluble in the solvent present in the composition, so that their structure is fixed. This method of fixing the structure of a shaped composition is not, of course, confined to the manufacture of sponges using molds such as form the subject of the present invention, but may be applied quite generally to the manufacture of molded articles from compositions having a basis of suitable saponifiable substances, e. g. cellulose acetate and other organic esters of cellulose and polymerised vinyl acetate, whether or not the mold surfaces bear protuberances.

Instead of using common salt to form the porous structure of the sponge or other article any other suitable substances may be employed, for example sodium sulphate, sodium borate, sodium carbonate, ammonium carbonate, sodium sulphite or bisulphite or magnesium sulphate. Alternatively, the porous structure of the materials may be produced by introducing bubbles of air or other gas into the composition.

While water is the most suitable substance to use in order to remove any soluble substances employed to produce the pores, other liquids, for example alcohol or benzene, may, if desired, be employed for the production of the pores in conjunction with organic compounds or other suitable substances which are soluble therein.

In general, proportions of cellulose acetate or other suitable base, solvent and salt or other soluble substances of the order of those given above are most suitable, but the constituents may be employed in other proportions if desired. For example, the solvent content of the composition described above may be reduced before molding until the proportion of solvent to cellulose acetate is of the order of 3:2 or even 1:1. The particles of salt or other substance employed may, for example, have a diameter of one-sixteenth to a quarter of an inch or more. For further information with regard to the production of the artificial sponges reference is made to U. S. Patent No. 2,085,052.

Examples of suitable molds according to the present invention are illustrated in the accompanying drawing, wherein—

Figure 1 is a vertical cross-section of one form of mold,

Figure 2 is an end view of the mold,

Figure 3 is a vertical cross-section of another form of mold, and

Figure 4 is a vertical cross-section of the same mold on the line 4—4'.

Referring to Figures 1 and 2 the mold consists of three similar portions 5, 6 and 7 forming the side of the mold, and two end portions 8 and 9. The interior surface 10 of the mold is provided with a large number of small protuberances 11. This mold is suitable for the production of artificial sponges resembling natural sea sponges.

Figures 3 and 4 show a mold suitable for the production of artificial loofahs, which consists of three side portions 12, 13 and 14 and two end portions 15 and 16 which are keyed into the side portions as shown. The end portions are provided with protuberances 17, and the interior surfaces 18 of the side portions are provided with a large number of linear protuberances 19 giving the effect of crossed fibre marks on the finished product.

While the process and apparatus of the present invention are particularly valuable in the manufacture of artificial sponges from cellulose acetate and other organic esters of cellulose they are not limited thereto, but are applicable to the manufacture of porous articles in general from suitable compositions, e. g. compositions containing cellulose xanthate.

Having described our invention what we desire to secure by Letters Patent is:

1. Process for the production of molded articles, which comprises shaping and setting a composition containing a normally solid saponifiable plastic substance selected from the group consisting of organic esters of cellulose and polymerized vinyl acetate in a mold, the molding surface of which carries a dressing comprising an alkaline saponifying agent whereby the surface of the product is saponified.

2. Process for the production of molded articles, which comprises shaping and setting a composition containing an organic ester of cellulose in a mold, the molding surface of which carries a dressing comprising an alkaline saponifying agent whereby the surface of the product is saponified.

3. Process for the production of molded articles, which comprises shaping and setting a composition containing cellulose acetate in a mold, the molding surface of which carries a dressing comprising an alkaline saponifying agent whereby the surface of the product is saponified.

4. Process for the production of molded articles, which comprises shaping and setting a composition containing an organic ester of cellulose in a mold, the molding surface of which carries a dressing comprising an alkaline saponifying agent whereby the surface of the product is saponified, and thereafter further saponifying the product.

5. Process for the production of molded articles, which comprises shaping and setting a suitable composition containing an organic ester of cellulose and particles of a water-soluble salt in a mold, the molding surface of which carries a dressing comprising an alkaline saponifying agent whereby the surface of the product is saponified, and thereafter treating the product with an aqueous medium to dissolve out the particles.

WILLIAM IVAN TAYLOR.
LESLIE BRISBANE GIBBINS.